United States Patent
Rasch et al.

(10) Patent No.: US 12,488,250 B2
(45) Date of Patent: Dec. 2, 2025

(54) WEIGHT REPETITION ON RPU CROSSBAR ARRAYS

(71) Applicant: INTERNATIONAL BUSINESS MACHINES CORPORATION, Armonk, NY (US)

(72) Inventors: Malte Johannes Rasch, Chappaqua, NY (US); Tayfun Gokmen, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1158 days.

(21) Appl. No.: 17/086,856

(22) Filed: Nov. 2, 2020

(65) Prior Publication Data

US 2022/0138579 A1    May 5, 2022

(51) Int. Cl.
*G06N 3/084*    (2023.01)
*G06F 16/22*    (2019.01)
*G06N 3/04*    (2023.01)

(52) U.S. Cl.
CPC ......... *G06N 3/084* (2013.01); *G06F 16/2237* (2019.01); *G06N 3/04* (2013.01)

(58) Field of Classification Search
CPC ....... G06N 3/084; G06N 3/04; G06F 16/2237
(Continued)

(56) References Cited

U.S. PATENT DOCUMENTS 7,043,616 B1    5/2006    McGrath
7,401,358 B1    7/2008    Christie et al.
(Continued)

FOREIGN PATENT DOCUMENTS

CN    107533668 A    1/2018
CN    108053029 A    5/2018
(Continued)

OTHER PUBLICATIONS

Ding Caiwen et al. 2017. CirCNN: Accelerating and compressing deep neural networks using block-circulant weight matrices. In Proceedings of (Year: 2017).*
(Continued)

*Primary Examiner* — Stephen S Hong
*Assistant Examiner* — Broderick C Anderson
(74) *Attorney, Agent, or Firm* — Tutunjian & Bitetto, P.C.; Kelsey M. Skodje

(57) ABSTRACT

A method is presented for artificial neural network training. The method includes storing weight values in an array of resistive processing unit (RPU) devices, wherein the array of RPU devices represents a weight matrix, defining the weight matrix to have an output dimension that is smaller than the input dimension such that the weight matrix has a rectangular configuration, and converting the weight matrix from a rectangular configuration to a more square-shaped configuration by repeating or concatenating the rectangular configuration of the weight matrix to increase a signal strength of a backward pass signal by copying an input of repeated weight elements during a forward cycle pass, summing output computations from the repeated weight elements, updating each of the repeated weight elements according to a backpropagated error or alternatively updating only one of the repeated weight elements by setting all forward values except one to zero during an update pass.

25 Claims, 9 Drawing Sheets

(58) Field of Classification Search
USPC .......................................................... 706/25
See application file for complete search history.

(56) References Cited

U.S. PATENT DOCUMENTS

| | | | |
|---|---|---|---|
| 9,646,243 | B1 | 5/2017 | Gokmen |
| 11,361,218 | B2 | 6/2022 | Rasch et al. |
| 11,556,770 | B2 | 1/2023 | Rasch et al. |
| 2009/0204823 | A1 | 8/2009 | Giordano et al. |
| 2018/0293208 | A1 | 10/2018 | Gokmen et al. |
| 2018/0293209 | A1 | 10/2018 | Gokmen et al. |
| 2019/0005353 | A1 | 1/2019 | Tullberg et al. |
| 2019/0080238 | A1 | 3/2019 | Wang et al. |
| 2019/0122105 | A1* | 4/2019 | Boybat Kara ........... G06N 3/08 |
| 2019/0251430 | A1 | 8/2019 | Gokmen et al. |
| 2019/0311264 | A1 | 10/2019 | Chen et al. |
| 2019/0311266 | A1 | 10/2019 | Liu et al. |
| 2019/0325291 | A1 | 10/2019 | Gokmen et al. |
| 2019/0340493 | A1 | 11/2019 | Coenen et al. |
| 2020/0394503 | A1* | 12/2020 | Kim ........................ G06N 3/084 |
| 2021/0240684 | A1* | 8/2021 | Xiao ................... G06F 16/1744 |

FOREIGN PATENT DOCUMENTS

| | | |
|---|---|---|
| CN | 108334944 A | 7/2018 |
| CN | 110506282 A | 11/2019 |
| CN | 110796241 A | 2/2020 |
| CN | 116391192 A | 7/2023 |
| DE | 112021004941 B4 | 4/2025 |
| EP | 2619670 B1 | 4/2016 |
| GB | 2614687 A | 7/2023 |
| JP | 2023-547800 A | 11/2023 |
| WO | 2017214507 A1 | 12/2017 |
| WO | 2019082077 A1 | 5/2019 |
| WO | 2022/090980 A1 | 5/2022 |

OTHER PUBLICATIONS

Gokmen, Tayfun, et al. "Training Deep Convolutional Neural Networks With Resistive Cross-Point Devices." Frontiers in Neuroscience, vol. 11, Oct. 2017, https://doi.org/10.3389/fnins.2017.00538. (Year: 2017).*

International Search Report issued in PCT Application No. PCT/IB2021/059959, Dated Feb. 8, 2022, pp. 1-9.

Gokmen et al., "Acceleration of Deep Neural Network Training with Resistive Cross-Point Devices: Design Considerations", Frontiers in Neurosciences. vol. 10, Article 333. Jul. 2016. pp. 1-13.

Hegde et al., "UCNN: Exploiting Computational Reuse in Deep Neural Networks via Weight Repetition", 45th Annual International Symposium on Computer Architecture. Jun. 1-6, 2018. pp. 674-687.

Imani et al., "FloatPIM: In-Memory Acceleration of Deep Neural Network Training with High Precision", 2019 International Symposium on Computer Architecture. Jun. 22-26, 2019. pp. 802-815.

Mahdiani et al., "DNN: Power-Efficient Neural Network Acceleration Using Differential Weights", IEEE Micro. vol. 40, No. 1. Jan. 14, 2020. pp. 67-74.

Japan Patent Office, "Notice of Reasons for Refusal" Feb. 12, 2025, 6 Pages, JP Application No. 2023-522777.

Schecter et al. "Nematic Bond Theory of Heisenberg Helimagnets", arXiv:1705.08917v1 [cond-mat.str-el], May 24, 2017, 5 pages.

* cited by examiner

Forward Pass

$$\tilde{y} = \tilde{W}x$$

$$yi = \sum_{j=0}^{k-1} \tilde{y}_{i+jk}$$

Backward Pass

$\tilde{W}'\tilde{\delta}$, where $\tilde{\delta}_{i+jk} = \delta i$ with $j=0, \ldots, k\text{-}1$

FIG. 7

WEIGHT REPETITION ON RPU CROSSBAR ARRAYS

BACKGROUND

The present invention relates generally to artificial neural networks (ANNs) having analog cross-point arrays of resistive processing unit (RPU) devices, and more specifically, to increasing signal strength by weight repetition on RPU cross-point arrays.

Machine learning is used to broadly describe a primary function of electronic systems that learn from data. In machine learning and cognitive science, ANNs are a family of statistical learning models inspired by biological neural networks, and in particular the brain. ANNs can be used to estimate or approximate systems and functions that depend on a large number of inputs and are generally unknown. ANNs are often embodied as so-called "neuromorphic" systems of interconnected processor elements that act as simulated "neurons" and exchange messages between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning.

SUMMARY

In accordance with an embodiment, a method is provided for artificial neural network (ANN) training. The method includes storing weight values in an array of resistive processing unit (RPU) devices, wherein the array of RPU devices represents a weight matrix W of the ANN with m rows and n columns by storing the weight values of the weight matrix W as resistive values of the RPU devices in the array, defining the weight matrix W to have an output dimension that is smaller than the input dimension such that the weight matrix W has a rectangular configuration, and converting the weight matrix W from a rectangular configuration to an approximately square-shaped configuration by repeating or concatenating the rectangular configuration of the weight matrix W to increase a signal strength of a backward pass signal by copying an input of repeated weight elements during a forward cycle pass, summing output computations from the repeated weight elements resulting in one output per row, and updating each of the repeated weight elements according to a backpropagated error or in the alternative updating only one of the repeated weight elements by setting all forward values except one to zero during an update pass.

A non-transitory computer-readable storage medium comprising a computer-readable program is presented for artificial neural network (ANN) training, wherein the computer-readable program when executed on a computer causes the computer to perform the steps of storing weight values in an array of resistive processing unit (RPU) devices, wherein the array of RPU devices represents a weight matrix W of the ANN with m rows and n columns by storing the weight values of the weight matrix W as resistive values of the RPU devices in the array, defining the weight matrix W to have an output dimension that is smaller than the input dimension such that the weight matrix W has a rectangular configuration, and converting the weight matrix W from a rectangular configuration to an approximately square-shaped configuration by repeating or concatenating the rectangular configuration of the weight matrix W to increase a signal strength of a backward pass signal by copying an input of repeated weight elements during a forward cycle pass, summing output computations from the repeated weight elements resulting in one output per row, updating each of the repeated weight elements according to a backpropagated error or in the alternative updating only one of the repeated weight elements by setting all forward values except one to zero during an update pass.

A system for artificial neural network (ANN) training is presented. The system includes an array of resistive processing unit (RPU) devices for storing weight values, wherein the array of RPU devices represents a weight matrix W of the ANN with m rows and n columns by storing the weight values of the weight matrix W as resistive values of the RPU devices in the array, and a processor to control electrical voltages across the RPU devices in the array, wherein the processor defines the weight matrix W to have an output dimension that is smaller than the input dimension such that the weight matrix W has a rectangular configuration, and converts the weight matrix W from a rectangular configuration to an approximately square-shaped configuration by repeating or concatenating the rectangular configuration of the weight matrix W to increase a signal strength of a backward pass signal.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 7 is a block/flow diagram of exemplary equations employed in the forward pass and backward pass, in accordance with an embodiment of the present invention;

Throughout the drawings, same or similar reference numerals represent the same or similar elements.

DETAILED DESCRIPTION

Figure 1:
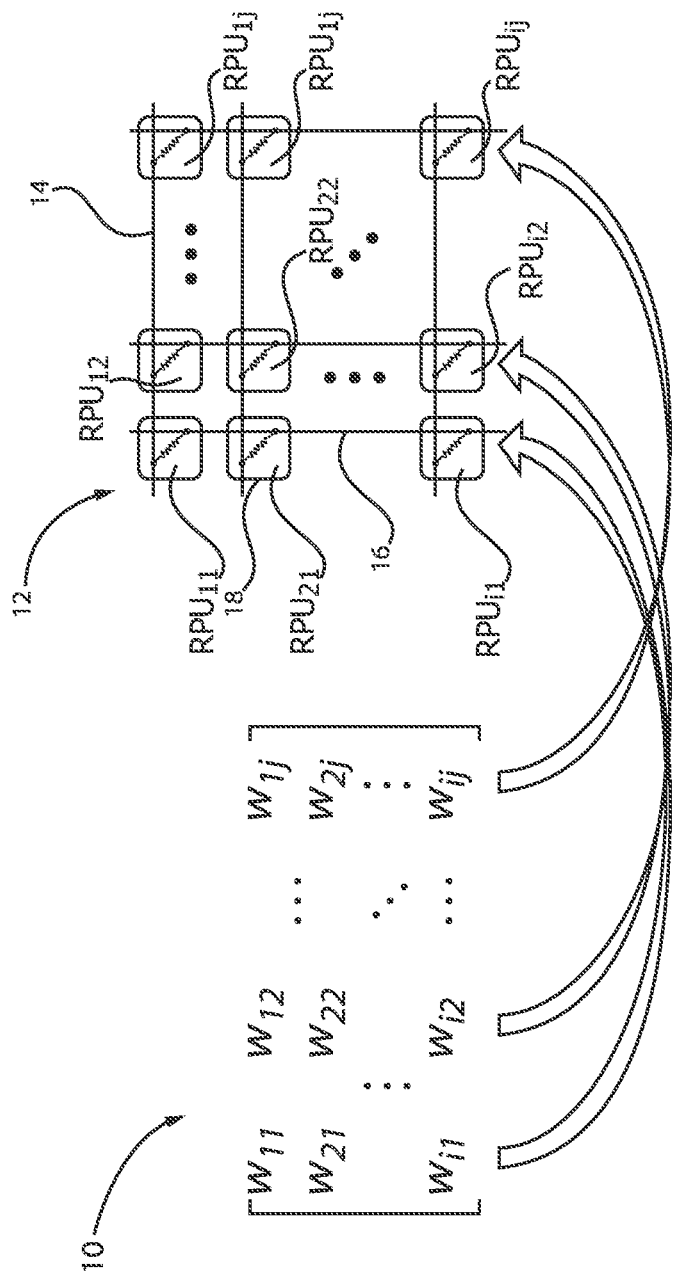
FIG. 1 is a diagram illustrating an artificial neural network (ANN) embodied in an analog cross-point array of resistive processing unit (RPU) devices, in accordance with an embodiment of the present invention.

Exemplary embodiments in accordance with the present invention provide for increasing signal strength of the backward pass signal by weight repetition on resistive processing unit (RPU) crossbar arrays. In particular, the weight matrix is modified by repetition or replication of columns and/or rows of the RPU crossbar array. This is achieved by repeating some weight elements on a resistive device array and accumulating the result of repeated weight elements (i.e., rows and/or columns) in a digital periphery to increase the output signal strength during the backward pass cycle, which boosts accuracy and lowers the requirement for high-resolution analog-to-digital converters (ADC). As a result, employing a lower precision ADC helps to increase power efficiency of an analog hardware chip, which provides for better noise and bound management, which, in turn, improves neural network training performance.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which may be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

However, ANN training with analog resistive cross-bar arrays such as analog RPU arrays can be difficult due to analog noise. Further, the training process is limited by the bounded ranges of the analog-to-digital converters (ADC) and digital-to-analog converters (DAC) employed for the RPU array. The ADC and DAC are used to convert digital input to the RPU to an analog signal, and the output from the RPU back to a digital signal, respectively. The analog noise can be reduced by a noise management approach involving increasing the output signal for rectangular weight matrices.

The exemplary embodiments of the present invention disclose a method and system that advantageously manage analog noise by repeatedly coding the weights of a deep neural network (DNN) network on one physical analog crossbar array to increase the output signal of the backward pass signal. The exemplary embodiments of the present invention further disclose a method and system that uses n times the rectangular weight matrix to make the rectangular weight matrix more square-shaped and, thus, a better fit to the physical squared-shaped crossbar array. The exemplary embodiments of the present invention further disclose a method and system that repeatedly codes the weights of a DNN (e.g., convolutional neural network (CNN)) network layer onto a single analog crossbar array and then sums (averages) or distributes (copies) the outputs of the repeated rows and/or columns in the digital periphery to maintain the correct DNN/CNN network architecture. The exemplary embodiments of the present invention further disclose a method and system that repeatedly codes the weights of a DNN/CNN network layer onto a single analog crossbar array and then sums (averages) or distributes (copies) the outputs of the repeated rows and/or columns in the digital periphery to maintain the correct DNN/CNN network architecture and either updates only one (e.g., randomly chosen) of the repeated weights or of all repeated weight simultaneously or concurrently.

Consequently, the exemplary methods and systems provide for improved neural network training performance. In particular, the weak output signal of the backward pass signal is significantly increased, which lessens the requirement for precise ADCs. Moreover, the noise of the analog elements is averaged over because of the repetition, so that training accuracy improves.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this invention.

FIG. 1 is a diagram illustrating an artificial neural network (ANN) embodied in an analog cross-point array of resistive processing unit (RPU) devices, in accordance with an embodiment of the present invention.

As shown in FIG. 1, each parameter (weight $w_{ij}$) of algorithmic (abstract) weight matrix 10 is mapped to a single RPU device ($RPU_{ij}$) on hardware, namely a physical cross-point array 12 of RPU devices. The cross-point array 12 has a series of conductive row wires 14 and a series of conductive column wires 16 oriented orthogonal to, and intersecting, the conductive row wires 14. The intersections of the conductive row wires 14 and column wires 16 are separated by RPU devices 18 forming cross-point array 12 of RPU devices 18. Each RPU device 18 can include a first terminal, a second terminal and an active region. A conduction state of the active region identifies a weight value of the RPU device 18, which can be updated/adjusted by application of a signal to the first/second terminals. Further, three-terminal (or even more terminal) devices can serve effectively as two-terminal resistive memory devices by controlling the extra terminals.

The matrix W with m rows and n columns is usually mapped to an RPU array having M columns and N rows, and, thus, the integration in the figures happens along the columns of the RPU array, whereas the summing happens mathematically along the row of W. So the mapping of the mathematical W to the RPU array is in fact transposed. As a result, for ease of displaying purposes, the mathematical row of the matrix W is displayed as the column of the RPU array. For instance, going from the top to bottom, and from the left to right of cross-point array 12, the RPU device 18 at the intersection of the first conductive row wire 14 and the first conductive column wire 16 is designated as $RPU_{11}$, the RPU device 18 at the intersection of the first conductive row wire 14 and the second conductive column wire 16 is designated as $RPU_{12}$, and so on. The mapping of the weight parameters in weight matrix 10 to the RPU devices 18 in cross-point array 12 follows a similar convention, albeit usually the convention is to interchange columns and rows of the RPU array for displaying purposes. For instance, weight $w_{i1}$ of weight matrix 10 is mapped to $RPU_{1i}$ of the cross-point array 12, weight $w_{i2}$ of weight matrix 10 is mapped to $RPU_{2i}$ of the cross-point array 12, and so on.

The RPU devices 18 of the cross-point array 12 function as the weighted connections between neurons in the ANN. The resistance of the RPU devices 18 can be altered by controlling the voltages applied between the individual conductive row and column wires 14 and 16. Altering the resistance is how data is stored in the RPU devices 18 based, for example, on a high resistance state or a low resistance state. The resistance state of the RPU devices 18 is read by applying a voltage and measuring the current that passes through the target RPU device 18. All of the operations involving weights are performed fully in parallel by the RPU devices 18.

Figure 8:
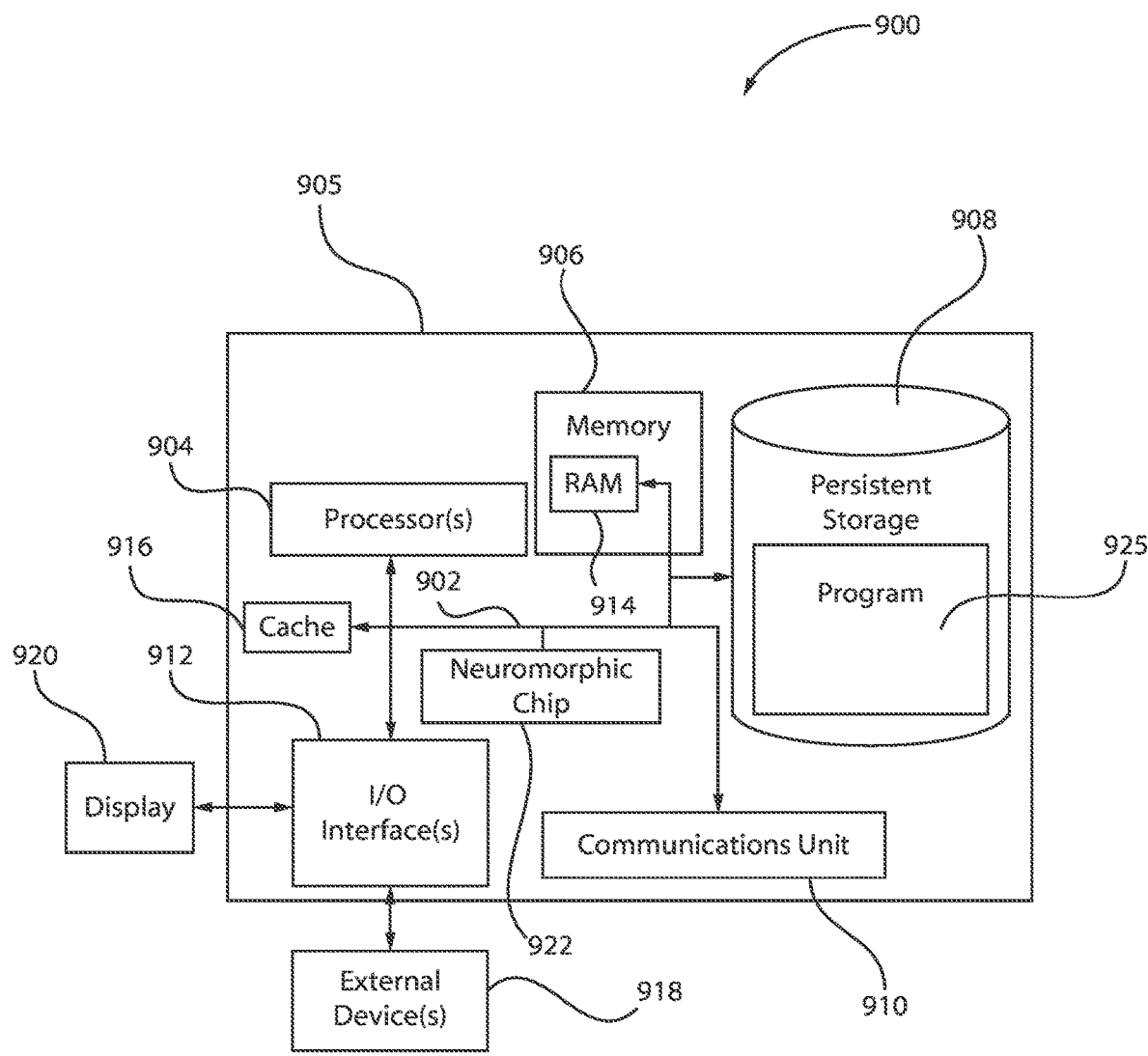
FIG. 8 depicts a block diagram of components of a computing system including a computing device operationally performing weight repetition on RPU crossbar arrays, in accordance with an embodiment of the present invention.

In machine learning and cognitive science, ANN-based models are a family of statistical learning models inspired by the biological neural networks of animals, and in particular the brain. These models can be used to estimate or approximate systems and cognitive functions that depend on a large number of inputs and weights of the connections which are generally unknown. ANNs are often embodied as so-called "neuromorphic" systems of interconnected processor elements that act as simulated "neurons" that exchange "messages" between each other in the form of electronic signals (FIG. 8). The connections in ANNs that carry electronic messages between simulated neurons are provided with numeric weights that correspond to the strength or weakness of a given connection (FIG. 8). These numeric weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons. This process is repeated until an output neuron is activated. The activated output neuron determines which character was read.

ANNs can be trained with an incremental or stochastic gradient descent (SGD) process, in which the error gradient of each parameter (weight $w_{ij}$) is calculated using back-propagation. Backpropagation is performed in three cycles, a forward cycle, a backward cycle, and a weight update cycle which are repeated multiple times until a convergence criterion is met. DNN based models include multiple processing layers that learn representations of data with multiple levels of abstraction. For a single processing layer where N input neurons are connected to M output neurons, the forward cycle involves computing a vector-matrix multiplication (y=Wx) where the vector x of length N represents the activities of the input neurons, and the matrix W of size M×N stores the weight values between each pair of the input and output neurons. The resulting vector y of length M is further processed by performing a non-linear activation on each of the resistive memory elements and then passed to the next layer.

Once the information reaches to the final output layer, the backward pass cycle involves calculating the error signal and backpropagating the error signal through the ANN. The backward pass cycle on a single layer involves a vector-matrix multiplication on the transpose (interchanging each row and corresponding column) of the weight matrix ($z=W^T\delta$), where vector $\delta$ of length M represents an error calculated by the output neurons and vector z of length N is further processed using the derivative of neuron non-linearity and then passed down to the previous layers.

Lastly, in the weight update cycle, the weight matrix W is updated by performing an outer product of the two vectors that are used in the forward and the backward pass cycles. This outer product of the two vectors is often expressed as $W \leftarrow W + \eta(\delta x^T)$, where $\eta$ is a global learning rate.

All of the operations performed on the weight matrix W during this backpropagation process can be implemented with the cross-point array 12 of RPU devices 18 having a corresponding number of m rows and n columns, where the stored conductance values in the cross-point array 12 form the matrix W. In the forward cycle, input vector x is transmitted as voltage pulses through each of the conductive column wires 16, and the resulting vector y is read as the current output from the conductive row wires 14. Similarly, when voltage pulses are supplied from the conductive row wires 14 as input to the backward pass cycle, a vector-matrix product is computed on the transpose of the weight matrix $W^T$. Finally, in the update cycle voltage pulses representing vectors x and $\delta$ are simultaneously supplied from the conductive column wires 16 and the conductive row wires 14. Thus, each RPU device 18 performs a local multiplication and summation operation by processing the voltage pulses coming from the corresponding conductive column wire 16 and conductive row wire 14, thus achieving an incremental weight update.

The resistance values of the RPU devices are limited in a bounded range with limited and finite state resolution which limits the weight range that can be used for ANN training. Further, the operations performed on an RPU array are analog in nature and thus prone to various sources of noise. When the input values to the RPU array are small (such as for the backward pass), the output signal y can be buried by the noise, thus producing an incorrect result. In the training phase, ANN training can involve a SGD process with backpropagation.

The CNN training is performed using batches. Accordingly, a batch of the input data to be used for training is selected. Using the input maps and the convolutional kernels, the output maps are generated. Generating the output maps is commonly referred to as a "forward pass." Further, the method includes using the output maps to determine how close or far off of the expected character recognition and the CNN was. A degree of error with relation to each of the matrices, which include the CNN is determined, such as using a gradient descent. Determining the relative errors is referred to as a "backward pass." The method further includes modifying or updating the matrices to adjust for the error. The adjusting the convolution kernels based on the output error information and using it to determine modifications for each neural network matrix, is referred to as an "update pass."

Figure 2:
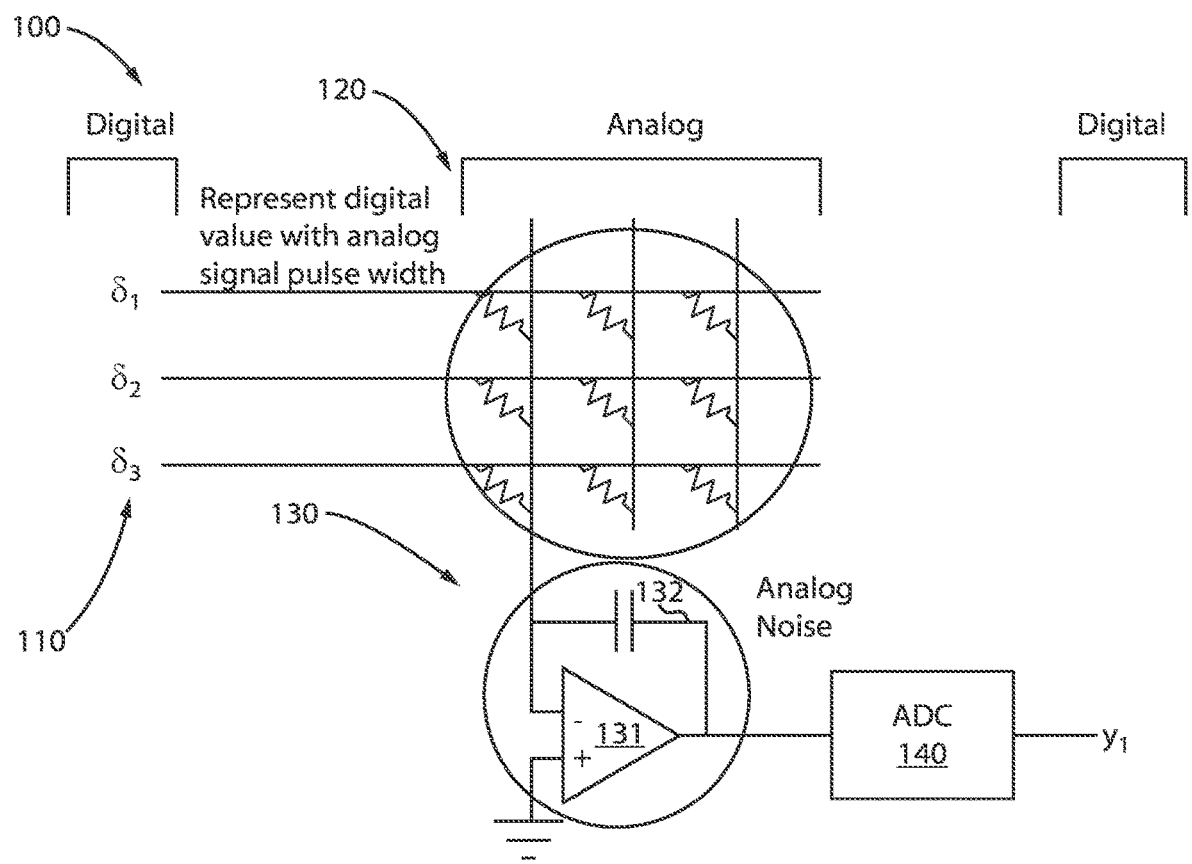
FIG. 2 illustrates an exemplary analog vector-matrix multiplication on an RPU array, in accordance with an embodiment of the present invention.

FIG. 2 illustrates an exemplary analog vector-matrix multiplication on an RPU array, in accordance with an embodiment of the present invention.

The analog vector-matrix multiplication 100 involves a set of digital input values ($\delta$) 110, where each of the digital input values ($\delta$) 110 is represented by a respective analog signal pulse width 120. The analog signal pulse widths 120 are provided as inputs to the array and the generated current signals are input to an operational amplifier (op-amp) integrating circuit 130 having an op-amp 131 with a capacitor ($C_{int}$) 132 connected to (across) the inverting input of the op-amp 131 and the output of the op-amp 131. The non-inverting input of the op-amp 131 is connected to ground. The output of the op-amp 131 is also connected to an input of an Analog-to-Digital Converter (ADC) 140. The ADC 140 outputs a signal $y_1$, representing a (digitized) result of the analog vector-matrix multiplication 100 on the RPU array.

For complete integration time, analog noise is accumulated at the op-amp 131. When the input values ($\delta$) 110 get too small (e.g., such as for the backward pass), the output signal is buried by the noise integrated for a cycle (SNR~0) and produces an incorrect result.

Although the actual pulse duration is much shorter than the complete integration time, the ADC 140 waits for a complete cycle to evaluate the analog output from the op-amp 131. The analog noise is desired to be reduced. FIGS. 3-6 present methods and systems for managing the noise by providing symmetrical signal strength between forward and backward pass signals.

Figure 3:
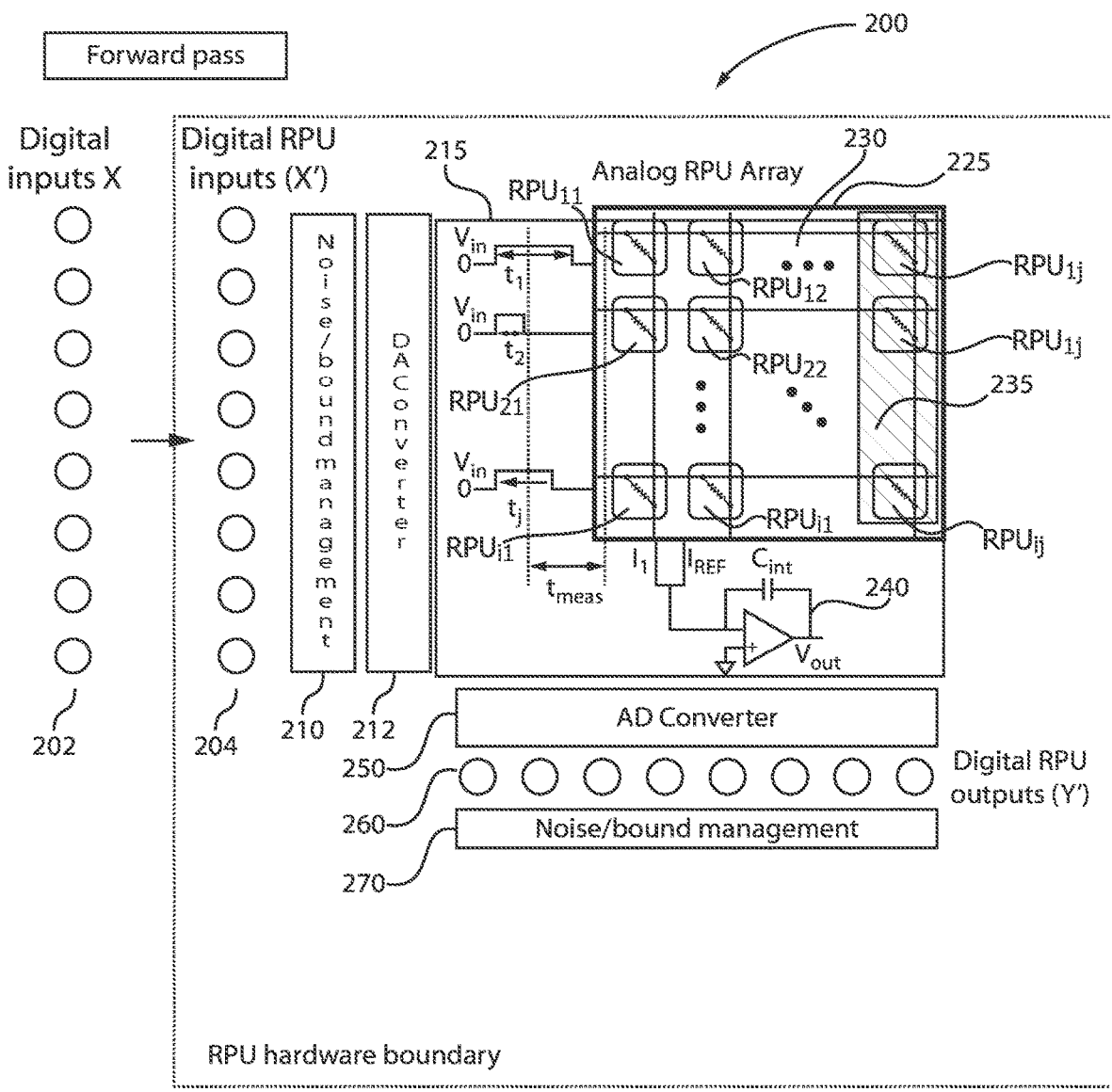
FIG. 3 is a diagram illustrating an exemplary rectangular RPU array, in a forward pass, where a rectangular sub-region of the RPU array is employed, in accordance with an embodiment of the present invention.

FIG. 3 is a diagram illustrating an exemplary rectangular RPU array, in a forward pass, where a rectangular sub-region of the RPU array is employed, in accordance with an embodiment of the present invention.

Each circle 202 represents a separate digital input x to RPU hardware system 200. For example, in a forward cycle pass the digital inputs x (or 202) are provided to the m rows of matrix W. The digital inputs 202 are designated as digital RPU inputs x' (or 204) when received by the RPU array 200. The digital RPU inputs 204 are fed into a noise/bound management unit or component 210. The vector-matrix multiplication performed on the RPU array 225 is analog in nature and therefore prone to various sources of noise. Thus, the noise/bound management unit or component 210 performs a noise reduction operation. A digital-to-analog converter (labeled "DA converter 212") provides the digital RPU inputs x' (or 204) as input to the RPU array 225 as analog pulse widths 215. The RPU array 225 includes a first region 230 and a second region 235. The first region 230 is a rectangular region which is being used, whereas the second region 235 is a region not being used. By the term "used," it is meant that the RPUs are loaded with conductance's corresponding to their weights. The (analog) outputs 240 from the RPU array 230 are converted into a vector of digital RPU outputs y' (or 260) by an analog-to-digital converter (labeled "AD Converter 250"). The digital RPU outputs 260 are fed into another noise/bound management unit or component 270. Also, the result of the vector-matrix multiplication is an analog voltage and therefore the results are bounded by the signal limits imposed by the circuits. Thus, the noise/bound management unit or component 270 performs a noise reduction operation to make sure that the results at the output of the RPU array 230 are always within the range of an acceptable voltage swing.

Figure 4:
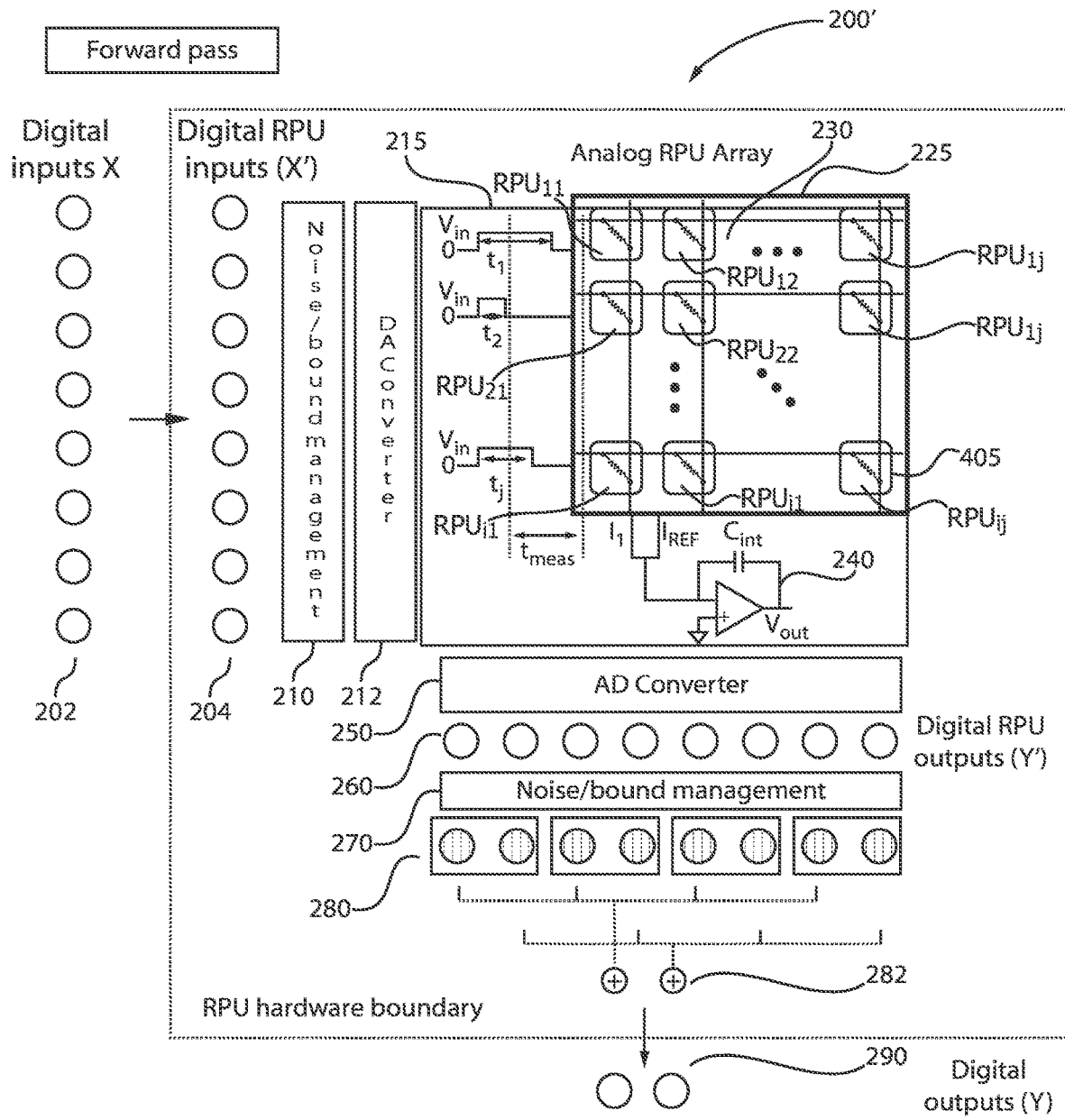
FIG. 4 is a diagram illustrating an exemplary square-shaped RPU array, in a forward pass, where the entire square-shaped RPU array is employed, in accordance with an embodiment of the present invention.

As a result, the output capacitor of resistive crossbar elements is of finite size (resulting in a finite output bound b) and analog output signals close to zero are set to zero because of a finite ADC resolution. Thus, if the analog output of the RPU array 230 is too small, the digital outputs can be all zero. This effect is unwelcome when the ADC resolution is small (e.g., the ADC bin size gets larger when output bound b is left unchanged). This effect is particularly unwelcome if the weight matrix coded onto the RPU array 230 is not square (as shown in FIG. 3). Then, on average, forward and backward directions have very different average signal strengths. For instance, in a 10-classes classification network, the last fully-connected layer is usually of size in the order of 1000×10. Thus, having at least $\sqrt{10}$ times less signal in the backward direction on average. If the backward signal is too small (e.g., less than the smallest ADC bin size), errors are set to zero and learning fails. For a symmetrical RPU (e.g., same hardware specs for forward and backward directions, such as ADC resolution and output bound) this effect is undesirable. FIG. 4 illustrates a solution to alleviate such issues.

FIG. 4 is a diagram illustrating an exemplary square-shaped RPU array, in a forward pass, where the entire square-shaped RPU array is employed, in accordance with an embodiment of the present invention.

Similar elements to FIG. 3 will not be described for sake of clarity. RPU hardware system 200' differs from RPU hardware system 200 (FIG. 3) in that the weight matrix W (225) has been replicated k times, such that the additional weight elements are employed in order to convert or modify the rectangular-shaped configuration of the weight matrix W (225) to a close-to or approximate or substantially square-shaped configuration. It is noted that the RPU array (225) is always physically square-shaped. However, only a rectangular sub-region of the physically square-shaped RPU array is being used if the weight matrix has a rectangular shape and assuming that the number of columns of the weight matrix fit into the input dimension of the RPU array. As noted above, by the term "used," it is meant that the RPUs are loaded with conductance's corresponding to their weights. Thus, in FIG. 3, the second region 235 (including several rows and or columns of RPUs) is not being used. However, in FIG. 4, the weight matrix is increased in size by adding more rows and/or columns of RPUs 405 to convert or modify the rectangular-shaped configuration of the weight matrix W (225) to a substantially or approximately square-shaped configuration. The replicated or repeated rows and/or columns 405 make the rectangular weight matrix 225 more square-shaped. The replicated or repeated rows and/or columns are designated as 280 after the noise/bound management unit 270 and are summed up (282) thus resulting in one output per row. Either all or only one repeated weight 290 of the repeated weights 280 is updated. If only one is updated, then the repeated weight 290 can be randomly chosen or sequentially selected. Thus, in the second embodiment only a subset of all of the repeated weights are updated simultaneously or concurrently.

The system knows how many rows/columns to add to achieve the approximately or substantially square-shaped configuration by computing the number of repeats of all weight matrices. To compute the number of repeats of all weight matrices, the system can simply divide the number of input dimension N of the matrix W (number of columns) by the output dimension M (number of rows) of the matrix W and take the largest integer number, e.g., r=floor(N/M). This is the number of how often all rows/columns are repeated. For instance, in the case of M=250 and N=512, then r=2, and the resulting weight matrix is of size N=512 and M=250*r=500. This method only makes the weight matrix approximately square-shaped.

Consequently, in order to resolve the issues mentioned above with regard to FIG. 3, rows/columns 405 are added to provide symmetry for the signal strength for both the forward pass and the backward pass. It is noted that the backward pass signal strength does not need to exactly match the forward pass signal strength. However, the backward pass signal strength is maximized if it is assumed that the input dimension is similar to the RPU array size. This would prevent the system from adding more rows than necessary since the physical RPU layout is substantially or approximately square-shaped.

In particular, assuming a squared-size RPU crossbar array, the exemplary embodiments enable replication of rows and/or columns to make a rectangular weight matrix W more square. In other words, physically, the RPU array is always square. However, only a rectangular sub-region of the RPU array is actually being used, as detailed in FIG. 3. Thus, the exemplary embodiments enable the use of more available crosspoints and then an output/input processing is added in digital by adding the repeated columns together.

For example, it is assumed that W is of size m×n. In many DNN networks, m<<n, e.g., the output dimension is much smaller than the input dimension.

The exemplary embodiments build or construct a larger matrix $\tilde{W}$ of size km×n and $\tilde{W}$=[W; W; . . . ; W], e.g., W is replicated k times and concatenated.

In the forward pass: $\tilde{y}=\tilde{W}x$ and then $y_i=\Sigma_{j=0}^{k-1} \tilde{y}_{i+jk}$, e.g., the replicated outputs are added up (e.g., in a digital periphery, after the ADC 250).

In the backward pass, described in detail below with reference to FIGS. 5 and 6:

$\widetilde{W}'\tilde{\delta}$ where $\tilde{\delta}_{i+jk}=\delta_i$ with j=0, . . . , k−1.

Thus the corresponding new delta inputs are copied from the original deltas.

Usually, the number of replications k are chosen so that mk≈n (while not exceeding the physical size limits of the crossbar array). Additionally, it is ensured that k is smaller than $b/w_{max}$, where b is the output bound (about 12) and $w_{max}$ is the maximal weight (about 0.6). Thus, k is maximized to achieve mk≈n, but not larger than $b/w_{max}$ (about 20).

In an update pass, either no changes (except possible learning rate adaptions), or alternatively a random fraction $\frac{k-1}{k}$ of the errors $\tilde{\delta}$ are set to zero.

Figure 5:
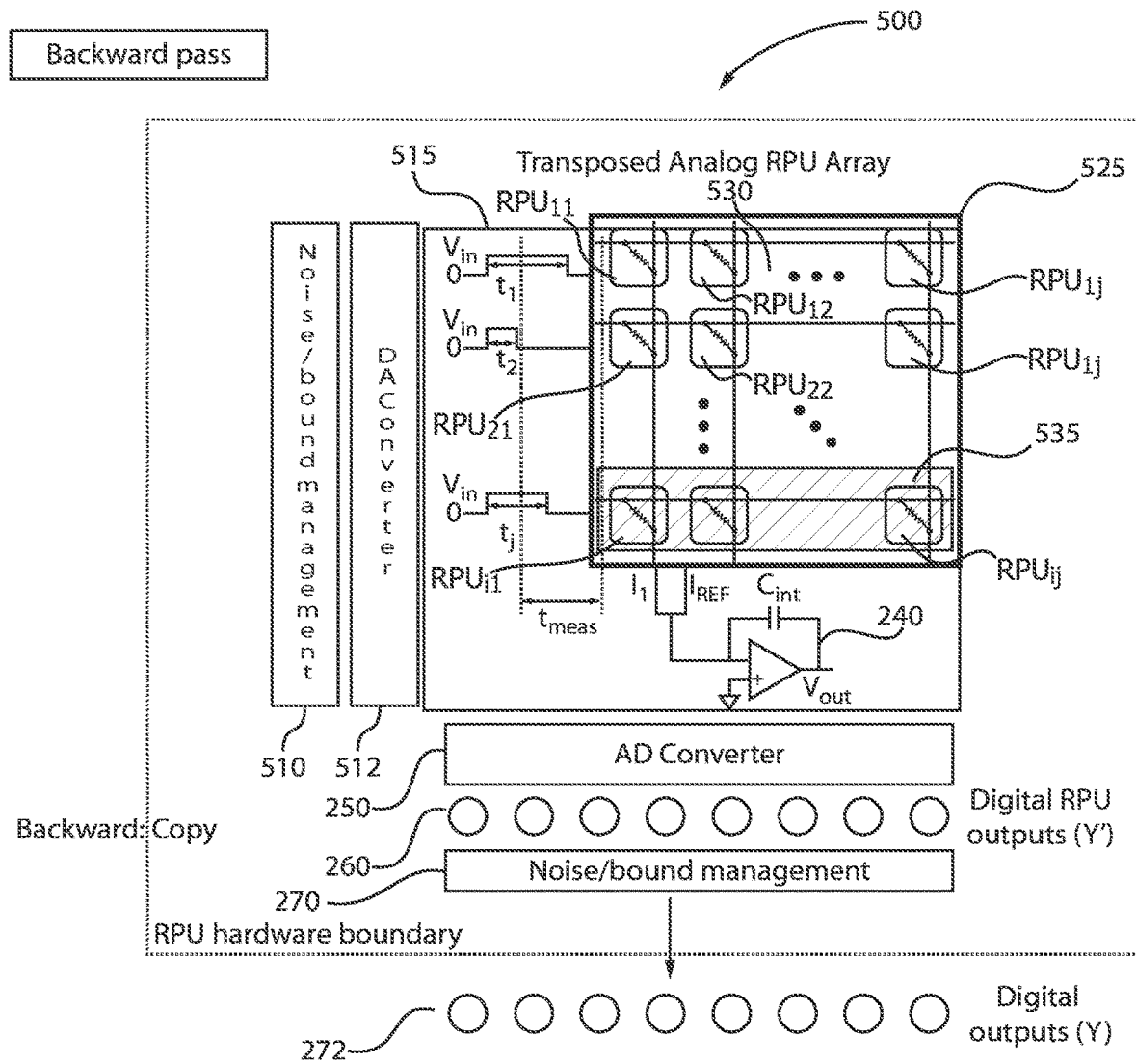
FIG. 5 is a diagram illustrating an exemplary rectangular RPU array, in a backward pass, where a rectangular subregion of the RPU array is employed, in accordance with an embodiment of the present invention.

FIG. 5 is a diagram illustrating an exemplary rectangular RPU array, in a backward pass, where a rectangular sub-region of the RPU array is employed, in accordance with an embodiment of the present invention.

In the RPU hardware system 500, the vector-matrix multiplication performed on the RPU array 525 is analog in nature and therefore prone to various sources of noise. Thus, the noise/bound management unit 510 performs a noise reduction operation. A digital-to-analog converter (labeled "DA converter 512") provides the digital RPU inputs x' (or 560; FIG. 6) as input to the RPU array 525 as analog pulse widths 515. The RPU array 525 includes a first region 530 and a second region 535. The first region 530 is a rectangular region which is being used, whereas the second region 535 is a region not being used. By the term "used," it is meant that the RPUs are loaded with conductance's corresponding to their weights. The (analog) outputs 240 from the RPU array 530 are converted into a vector of digital RPU outputs y' (or 260) by an analog-to-digital converter (labeled "AD Converter 250"). The digital RPU outputs 260 are fed into another noise/bound management unit 270. Also, the result of the vector-matrix multiplication is an analog voltage, and, therefore, the results are bounded by the signal limits imposed by the circuits. Thus, the noise/bound management unit 270 performs a noise reduction operation to make sure that the results at the output of the RPU array 530 are always within the range of an acceptable voltage swing. Digital outputs 272 are output from the noise/bound management unit 270.

As noted above, the output capacitor of resistive crossbar elements is of finite size (resulting in a finite output bound b) and analog output signals close to zero are set to zero because of a finite ADC resolution. Thus, if the analog output of the RPU array 530 is too small, the digital outputs can be all zero. This effect is unwelcome when the ADC resolution is small (e.g., the ADC bin size gets larger when output bound b is left unchanged). This effect is particularly unwelcome if the weight matrix coded onto the RPU array 530 is not square (as shown in FIG. 5). Then, on average, forward and backward directions have very different average signal strengths. If the backward signal is too small (e.g., less than the smallest ADC bin size), errors are set to zero and learning fails. For a symmetrical RPU (e.g., same hardware specs for forward and backward directions, such as ADC resolution and output bound) this effect is undesirable. FIG. 6 illustrates a solution to alleviate such issues.

Figure 6:
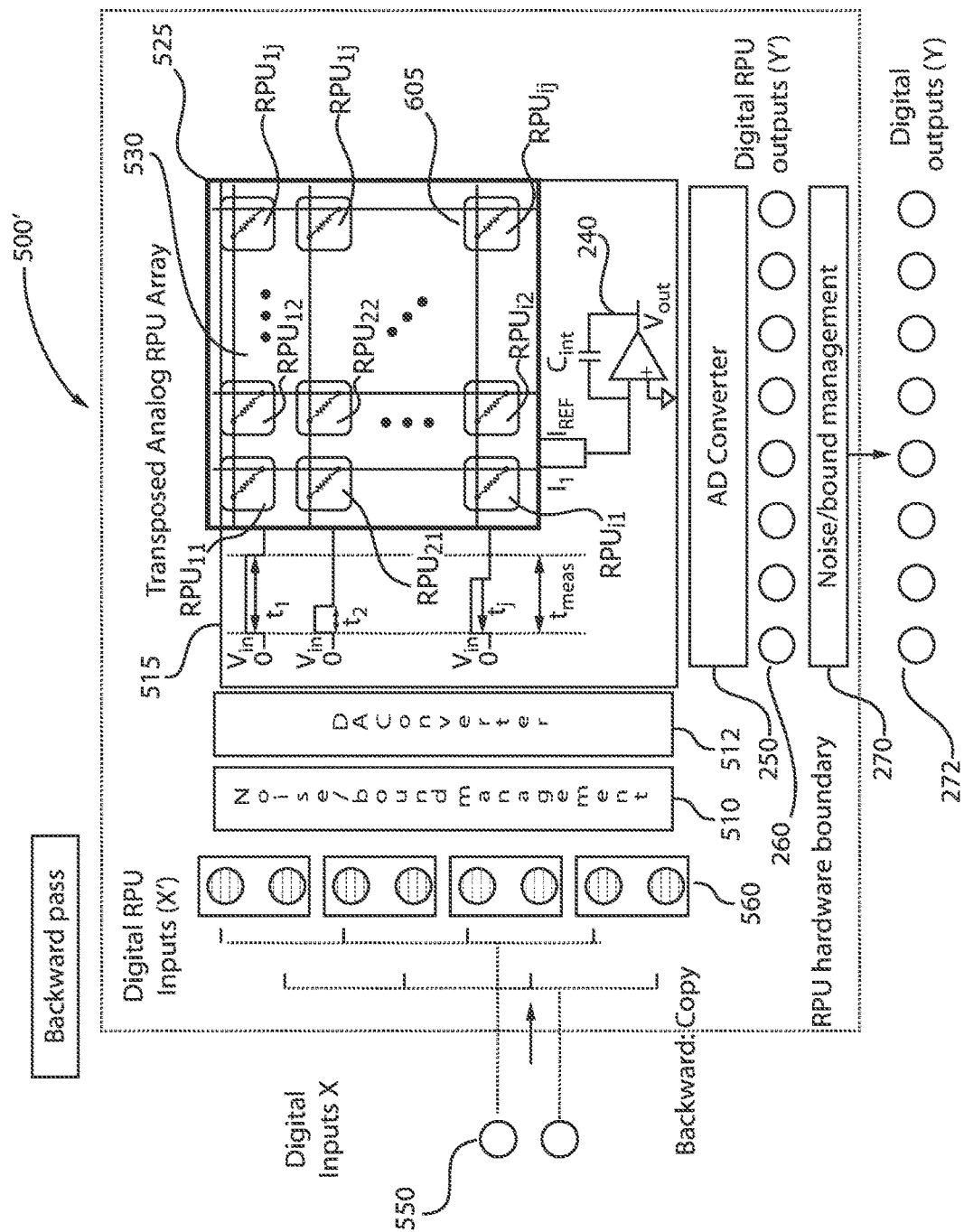
FIG. 6 is a diagram illustrating an exemplary rectangular RPU array, in a backward pass, where the entire square-shaped RPU array is employed and where the output dimension m is half of the input dimensions so that each column is repeated exactly once, in accordance with an embodiment of the present invention.

FIG. 6 is a diagram illustrating an exemplary rectangular RPU array, in a backward pass, where the entire square-shaped RPU array is employed and where the output dimension m is half of the input dimensions so that each column is repeated exactly once, in accordance with an embodiment of the present invention.

In a backward cycle pass, the digital inputs x (or 550) are provided to the n columns of matrix W (525). RPU hardware system 500' differs from RPU hardware system 500 (FIG. 5) in that the weight matrix W (525) has been replicated k times, such that the additional weight elements are employed in order to convert or modify the rectangular-shaped configuration of the weight matrix W (525) to a substantially or approximately square-shaped configuration. It is noted that the weight matrix W (525) is always physically square-shaped. However, only a rectangular subregion of the physically square-shaped RPU array is being used. As noted above, by the term "used," it is meant that the RPUs are loaded with conductance's corresponding to their weights. Thus, in FIG. 5, the second region 535 (including several rows and or columns of RPUs) is not being used. However, in FIG. 6, the weight matrix is increased in size by adding more rows and/or columns of RPUs 605 to convert or modify the rectangular-shaped configuration of the weight matrix W (525) to a substantially or approximately square-shaped configuration. The replicated or repeated rows and/or columns 605 make the rectangular weight matrix 525 more square-shaped. The replicated or repeated rows and/or columns are designated as 560 before the noise/bound management unit 510.

FIG. 7 is a block/flow diagram of exemplary equations 700 employed in the forward pass and backward pass, in accordance with an embodiment of the present invention.

In conclusion, the exemplary embodiments disclose a method and system that replicates/repeats/concatenates a rectangular weight matrix of a DNN onto a physical analog crossbar and copies the input to the repeated weight elements during the forward pass. The exemplary embodiments further disclose a method and system that replicates/repeats/concatenates a rectangular weight matrix of a DNN onto a physical analog crossbar and averages or sums the output computations from the repeated weight elements to result in one output per row to the original weight matrix. The exemplary embodiments further disclose a method and system that replicates/repeats/concatenates a rectangular weight matrix of a DNN onto a physical analog crossbar and updates each repeated weight according to the back propagated error. The exemplary embodiments further disclose a method or system that replicates/repeats/concatenates a rectangular weight matrix of a DNN onto a physical analog crossbar and updates only one of the repeated weight elements by setting all of the backward deltas (or the forward values) except one to zero during the update pass.

FIG. 8 depicts a block diagram of components of system 900, which includes computing device 905. It should be appreciated that FIG. 8 provides only an illustration of one implementation and does not imply any limitations with regard to the environments in which different embodiments can be implemented. Many modifications to the depicted environment can be made.

Computing device 905 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906, cache memory 916, and persistent storage 908 are computer readable storage media. In this embodiment, memory 906 includes random access memory (RAM) 914. In general, memory 906 can include any suitable volatile or non-volatile computer readable storage media.

In some embodiments of the present invention, deep learning program 925 is included and operated by neuromorphic chip 922 as a component of computing device 905. In other embodiments, deep learning program 925 is stored in persistent storage 908 for execution by neuromorphic chip 922 in conjunction with one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer readable storage medium that is also part of persistent storage 908.

In some embodiments of the present invention, neuromorphic chip 922 is included in computing device 905 and connected to communications fabric 902.

Communications unit 910, in these examples, provides for communications with other data processing systems or devices, including resources of distributed data processing environment. In these examples, communications unit 910 includes one or more network interface cards. Communications unit 910 can provide communications through the use of either or both physical and wireless communications links. Deep learning program 925 can be downloaded to persistent storage 908 through communications unit 910.

I/O interface(s) 912 allows for input and output of data with other devices that can be connected to computing system 900. For example, I/O interface 912 can provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Display 920 provides a mechanism to display data to a user and can be, for example, a computer monitor.

Figure 9:
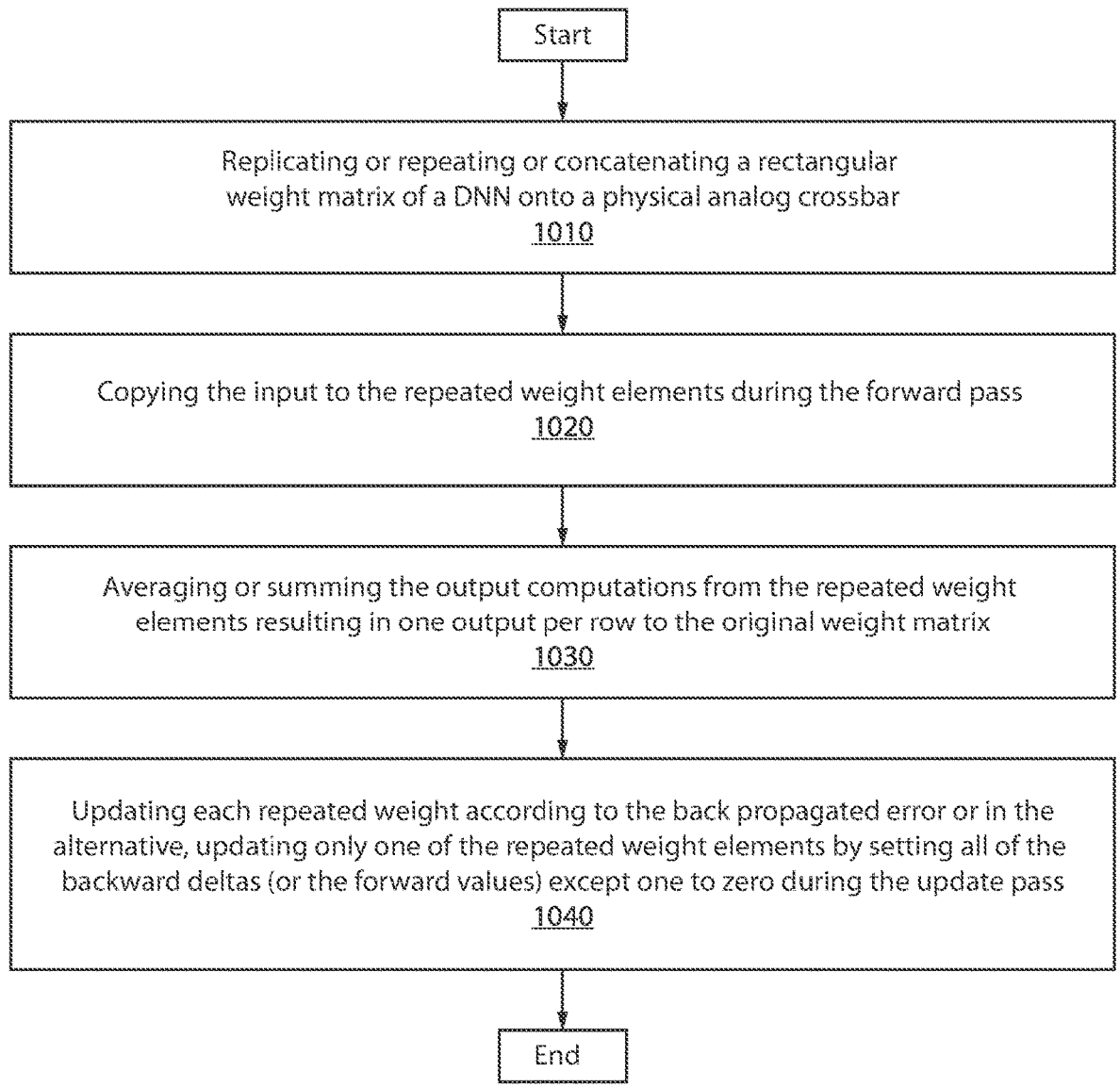
FIG. 9 is an exemplary block/flow diagram of a method for increasing a signal strength by weight repetition on RPU crossbar arrays, in accordance with an embodiment of the present invention.

FIG. 9 is an exemplary block/flow diagram of a method for increasing a signal strength by weight repetition on RPU crossbar arrays, in accordance with an embodiment of the present invention.

At block 1010, replicate or repeat or concatenate a rectangular weight matrix of a DNN onto a physical analog crossbar.

At block 1020, copy the input to the repeated weight elements during the forward pass.

At block 1030, average or sum the output computations from the repeated weight elements resulting in one output per row to the original weight matrix.

At block 1040, update each repeated weight according to the back propagated error or in the alternative update only one of the repeated weight elements by setting all of the backward deltas (or the forward values) except one to zero during the update pass.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for increasing signal strength by weight repetition on RPU cross-point arrays (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for artificial neural network (ANN) training, the method comprising:
   storing weight values in an array of resistive processing unit (RPU) devices, wherein the array of RPU devices represents a weight matrix W of the ANN with m rows and n columns by storing the weight values of the weight matrix W as resistive values of the RPU devices in the array;
   defining the weight matrix W to have an output dimension that is smaller than the input dimension such that the weight matrix W has a rectangular configuration; and
   converting the weight matrix W from a rectangular configuration to a square-shaped configuration by repeating or concatenating the rectangular configuration of the weight matrix W to increase a signal strength of a backward pass signal by:
      copying an input of repeated weight elements during a forward cycle pass;
      summing output computations from the repeated weight elements resulting in one output per row; and
      updating elements of the weight matrix W by increasing signal strength symmetry between the backward pass signal and a signal from the forward cycl pass.

2. The method of claim 1, wherein the weight elements are the m rows and n columns of the weight matrix W.

3. The method of claim 1, wherein the repeated weight elements added to the weight matrix W provide for symmetrical signal strength between a forward pass signal and the backward pass signal.

4. The method of claim 1, wherein, in the forward cycle pass, digital RPU inputs are fed into a first noise/bound measurement component and a digital-to-analog converter (DAC) before being received by the array of RPU devices.

5. The method of claim 4, wherein, in the forward cycle pass, the output computations from the repeated weight elements are summed after being processed by an analog-to-digital converter (ADC).

6. The method of claim 5, wherein in the forward cycle pass:
   $\tilde{y} = \tilde{W}x$ and $y_i = \Sigma_{j=0}^{k-1} \tilde{y}_{i+jk}$
   wherein $\tilde{y}$ is an immediate output signal vector from the modified RPU array/weight matrix, $\tilde{W}$ is a modified weight matrix that is stored on the RPU array, x is an input signal vector, $y_i$ is an i-th element of the original output vector, and k is a number of replications.

7. The method of claim 1, wherein, in a backward cycle pass:
   $\tilde{W}'\tilde{\delta}$, where $\tilde{\delta}_{i+jk} = \delta_i$ with $j=0, \ldots, k-1$
   wherein $\tilde{W}'$ is a transposed modified weight matrix stored on the RPU array, $\tilde{\delta}$ is a modified error signal vector, which are inputs to the modified RPU array/weight matrix during the backward pass, and $\tilde{\delta}_{i+jk}$ is an i+jk-th element of the modified error signals.

8. A non-transitory computer-readable storage medium comprising a computer-readable program for artificial neural network (ANN) training, wherein the computer-readable program when executed on a computer causes the computer to perform the steps of:
   storing weight values in an array of resistive processing unit (RPU) devices, wherein the array of RPU devices represents a weight matrix W of the ANN with m rows and n columns by storing the weight values of the weight matrix W as resistive values of the RPU devices in the array;
   defining the weight matrix W to have an output dimension that is smaller than the input dimension such that the weight matrix W has a rectangular configuration; and
   converting the weight matrix W from a rectangular configuration to a square-shaped configuration by repeating or concatenating the rectangular configuration of the weight matrix W to increase a signal strength of a backward pass signal by:
      copying an input of repeated weight elements during a forward cycle pass;
      summing output computations from the repeated weight elements resulting in one output per row; and
      updating elements of the weight matrix W by increasing signal strength symmetry between the backward pass signal and a signal from the forward cycle pass.

9. The non-transitory computer-readable storage medium of claim 8, wherein the weight elements are the m rows and n columns of the weight matrix W.

10. The non-transitory computer-readable storage medium of claim 8, wherein the repeated weight elements added to the weight matrix W provide for symmetrical signal strength between a forward pass signal and the backward pass signal.

11. The non-transitory computer-readable storage medium of claim 8, wherein, in the forward cycle pass, digital RPU inputs are fed into a first noise/bound measurement component and a digital-to-analog converter (DAC) before being received by the array of RPU devices.

12. The non-transitory computer-readable storage medium of claim 11, wherein, in the forward cycle pass, the output computations from the repeated weight elements are summed after being processed by an analog-to-digital converter (ADC).

13. The non-transitory computer-readable storage medium of claim 12, wherein in the forward cycle pass:
$\tilde{y}=\tilde{W}x$ and $y_i=\Sigma_{j=0}^{k-1}\tilde{y}_{i+jk}$
wherein $\tilde{y}$ is an immediate output signal vector from the modified RPU array/weight matrix, $\tilde{W}$ is a modified weight matrix that is stored on the RPU array, x is an input signal vector, $y_i$ is an i-th element of the original output vector, and k is a number of replications.

14. The non-transitory computer-readable storage medium of claim 8, wherein, in a backward cycle pass:
$\tilde{W}'\tilde{\delta}$, where $\tilde{\delta}_{i+jk}=\delta_i$ with j=0, . . . , k−1
wherein $\tilde{W}'$ is a transposed modified weight matrix stored on the RPU array, $\tilde{\delta}$ is a modified error signal vector, which are inputs to the modified RPU array/weight matrix during the backward pass, and $\tilde{\delta}_{i+jk}$ is an i+jk-th element of the modified error signals.

15. A system for artificial neural network (ANN) training, the system comprising:
an array of resistive processing unit (RPU) devices for storing weight values, wherein the array of RPU devices represents a weight matrix W of the ANN with m rows and n columns by storing the weight values of the weight matrix W as resistive values of the RPU devices in the array; and
a processor to control electrical voltages across the RPU devices in the array, wherein the processor:
defines the weight matrix W to have an output dimension that is smaller than the input dimension such that the weight matrix W has a rectangular configuration; and
converts the weight matrix W from a rectangular configuration to a square-shaped configuration by repeating or concatenating the rectangular configuration of the weight matrix W to increase a signal strength of a backward pass signal, the signal strength is increased by:
updating elements of the weight matrix W by increasing signal strength symmetry between the backward pass signal and a signal from the forward cycle pass.

16. The system of claim 15, wherein increasing signal strength further comprises:
copying an input of repeated weight elements during a forward cycle pass; and
summing output computations from the repeated weight elements resulting in one output per row.

17. The system of claim 16, wherein the repeated weight elements added to the weight matrix W provide for symmetrical signal strength between a forward pass signal and the backward pass signal.

18. The system of claim 17, wherein, in the forward cycle pass, digital RPU inputs are fed into a first noise/bound measurement component and a digital-to-analog converter (DAC) before being received by the array of RPU devices.

19. The system of claim 18, wherein, in the forward cycle pass, the output computations from the repeated weight elements are summed after being processed by an analog-to-digital converter (ADC).

20. The system of claim 15, wherein the one repeated weight element updated is selected at random.

21. A method for artificial neural network (ANN) training, the method comprising:
storing weight values in an array of resistive processing unit (RPU) devices, wherein the array of RPU devices represents a weight matrix W of the ANN with m rows and n columns by storing the weight values of the weight matrix W as resistive values of the RPU devices in the array;
defining the weight matrix W to have an output dimension that is smaller than the input dimension such that the weight matrix W has a rectangular configuration; and
converting the weight matrix W from a rectangular configuration to a square-shaped configuration by repeating or concatenating the rectangular configuration of the weight matrix W to increase a signal strength of a backward pass signal by:
copying an input of repeated weight elements during a forward cycle pass;
summing output computations from the repeated weight elements resulting in one output per row; and
updating elements of the weight matrix W by increasing signal strength symmetry between the backward pass signal and a signal from the forward cycle pass.

22. The method of claim 21, wherein the repeated weight elements added to the weight matrix W provide for symmetrical signal strength between a forward pass signal and the backward pass signal.

23. The method of claim 21, wherein, in the forward cycle pass, digital RPU inputs are fed into a first noise/bound measurement component and a digital-to-analog converter (DAC) before being received by the array of RPU devices.

24. The method of claim 23, wherein, in the forward cycle pass, the output computations from the repeated weight elements are summed after being processed by an analog-to-digital converter (ADC).

25. A non-transitory computer-readable storage medium comprising a computer-readable program for artificial neural network (ANN) training, wherein the computer-readable program when executed on a computer causes the computer to perform the steps of:
storing weight values in an array of resistive processing unit (RPU) devices, wherein the array of RPU devices represents a weight matrix W of the ANN with m rows and n columns by storing the weight values of the weight matrix W as resistive values of the RPU devices in the array;
defining the weight matrix W to have an output dimension that is smaller than the input dimension such that the weight matrix W has a rectangular configuration; and
converting the weight matrix W from a rectangular configuration to a square-shaped configuration by repeating or concatenating the rectangular configuration of the weight matrix W to increase a signal strength of a backward pass signal by:
copying an input of repeated weight elements during a forward cycle pass;
summing output computations from the repeated weight elements resulting in one output per row; and updating elements of the weight matrix W by increasing signal strength symmetry between the backward pass signal and a signal from the forward cycle pass.

\* \* \* \* \*